US010924191B2

(12) United States Patent
Crowder et al.

(10) Patent No.: US 10,924,191 B2
(45) Date of Patent: Feb. 16, 2021

(54) LOW BRIGHTNESS, ENTANGLEMENT-BASED, SEMI-PASSIVE PRIVATE COMMUNICATION PROTOCOL

(71) Applicant: The Government of the United States of America, as represented by the Secretary of the Navy, Arlington, VA (US)

(72) Inventors: Tanner Crowder, Arlington, VA (US); Marco Lanzagorta, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/687,760

(22) Filed: Nov. 19, 2019

(65) Prior Publication Data

US 2020/0162171 A1 May 21, 2020

Related U.S. Application Data (60) Provisional application No. 62/769,722, filed on Nov. 20, 2018.

(51) Int. Cl.
*H04B 10/70* (2013.01)
*H04B 10/50* (2013.01)
(Continued)

(52) U.S. Cl.
CPC .......... *H04B 10/70* (2013.01); *H04B 10/50* (2013.01); *H04B 10/691* (2013.01); *G02B 26/0816* (2013.01); *G02B 27/10* (2013.01)

(58) Field of Classification Search
CPC ...... H04B 10/50; H04B 10/691; H04B 10/70; G01S 17/89
See application file for complete search history.

(56) References Cited

U.S. PATENT DOCUMENTS

| 2007/0002307 A1* | 1/2007 | Zaugg | G01C 3/08 356/5.01 |
| 2008/0075410 A1* | 3/2008 | Spillane | B82Y 10/00 385/122 |

(Continued)

OTHER PUBLICATIONS

Lanzagorta, Quantum Imaging for Underwater Artic Navigation, Radar Sensor Technology XXI, SPIE Defense + Security, 2017. Proceedings of SPIE, May 1, 2017. pp. 101880G-1-10880G-27, vol. 10188, SPIE, Anaheim, CA, USA.

(Continued)

*Primary Examiner* — Dzung D Tran
(74) *Attorney, Agent, or Firm* — US Naval Research Laboratory; Suresh Koshy (57) ABSTRACT

A communications apparatus includes an entangled-photon generator for generating entangled pairs of photons including a plurality of idler photons and a corresponding plurality of signal photons. The communications apparatus includes a quantum memory for storing the plurality of idler photons. The communications apparatus includes a transmitter for transmitting the plurality of signal photons. The communications apparatus includes an optical element for selectively reflecting the plurality of signal photons to encode a reflected signal. The communications apparatus includes a receiver for detecting a plurality of incoming photons. The communications apparatus includes a correlator configured to determine the reflected signal from the plurality of incoming photons. The correlator determines an entanglement correlation between the plurality of incoming photons with the plurality of idler photons. A presence of entanglement correlation indicates that a detected incoming photon of the plurality of incoming photons is a reflected signal photon of the plurality of signal photons.

18 Claims, 9 Drawing Sheets

(51) Int. Cl.
*H04B 10/69* (2013.01)
*G02B 27/10* (2006.01)
*G02B 26/08* (2006.01)

(56) References Cited

U.S. PATENT DOCUMENTS

| | | | | |
|---|---|---|---|---|
| 2008/0258049 | A1* | 10/2008 | Kuzmich | B82Y 10/00 250/214.1 |
| 2014/0099104 | A1* | 4/2014 | Peters | H04L 9/0852 398/25 |
| 2016/0018525 | A1* | 1/2016 | Lanzagorta | G01S 7/493 701/472 |
| 2016/0356917 | A1* | 12/2016 | Bhongale | G01V 5/04 |

OTHER PUBLICATIONS

Zhuang, et al., Optimum Mixed-State Discrimination for Noisy Entanglement-Enhanced Sensing. Physical Review Letters, Jan. 27, 2017, pp. 040801-1-040801-6, vol. 118, American Physical Society, College Park, MD, USA.

Lanzagorta, Low-brightness Quantum Radar, Radar Sensor Technology XIX, SPIE Defense + Security, 2015, Proceedings of SPIE, May 21, 2015, pp. 946113-1-946113-25, vol. 9461, SPIE, Baltimore, MD, USA.

Barzanjeh, et al., Microwave Quantum Illumination, Physical Review Letters; Feb. 27, 2015, pp. 080503-1-080503-5, vol. 114, American Physical Society, College Park, MD, USA.

Lopaeva, et al., Experimental Realization of Quantum Illumination, Physical Review Letters, Apr. 12, 2013, pp. 153603-1-153603-5, vol. 110, American Physical Society, College Park, MD, USA.

Guha, et al., Gaussian-state Quantum-illumination Receivers for Target Detection, Physical Review A, Nov. 10, 2009, pp. 052310-1-052310-4, vol. 80, The American Physical Society, College Park, MD, USA.

Tan, et al., Quantum Illumination with Gaussian States, Physical Review Letters, Dec. 19, 2008, pp. 253601-1-253601-4, vol. 101, The American Physical Society, College Park, MD, USA.

Lloyd, Enhanced Sensitivity of Photodetection via Quantum Illumination, Science, pp. 1463-1465, vol. 321, American Association for the Advancement of Science, Washington, DC, USA.

\* cited by examiner

LOW BRIGHTNESS, ENTANGLEMENT-BASED, SEMI-PASSIVE PRIVATE COMMUNICATION PROTOCOL

CROSS-REFERENCE TO RELATED APPLICATIONS

This Application claims the benefit of U.S. Provisional Application Ser. No. 62/769,722 filed on 20 Nov. 2018, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 108858-US2.

BACKGROUND OF THE INVENTION

Field of the Invention

This invention relates in general to a method and/or apparatus for optical communications, and in particular to a method/or apparatus for entanglement-based optical communications.

Description of the Related Art

Classical (i.e., non-entanglement-based) communication protocols can be used to communicate with a low probability of adversarial interception. However, these conventional protocols are usually based on a retrodirectional reflector and classical signals.

BRIEF SUMMARY OF THE INVENTION

An embodiment of the invention provides an entanglement-based low-brightness, semi-passive communication protocol that has a low probability of adversarial interception. In this protocol, one party generates a pair of entangled photons (a signal and idler photon) and sends the signal photon to another party while storing the idler photon: the other party transmits information by manipulating the signal photon with a highly transmissive optical element.

An embodiment of the invention includes a highly transmissive optical element and an entanglement-based low brightness signal, both of which camouflage the sender's and receiver's locations, and they increase the range and fidelity over classical low brightness signals.

An embodiment of the invention includes a communications apparatus. The communications apparatus includes a standard entangled-photon generator configured to generate a plurality of entangled pairs of photons. The plurality of entangled pairs of photons includes a plurality of idler photons and a corresponding plurality of signal photons. The communications apparatus includes a standard quantum memory configured to store the plurality of idler photons. The communications apparatus includes a standard transmitter configured to transmit the plurality of signal photons. The communications apparatus includes a standard optical element configured to selectively reflect the plurality of signal photons so as to encode a reflected signal. The communications apparatus includes a standard receiver configured to detect a plurality of incoming photons. For example, the receiver includes a standard single photon detector or receiver. The communications apparatus includes a standard correlator configured to determine the reflected signal from the plurality of incoming photons. The correlator determines an entanglement correlation between the plurality of incoming photons and the plurality of idler photons. A presence of entanglement correlation indicates that a detected incoming photon of the plurality of incoming photons is a reflected signal photon of the plurality of signal photons.

Advantages of one or more embodiments of the invention over conventional technologies include the following. An embodiment of the invention greatly increases the communication range over a similarly powered classical protocol. An embodiment of the invention decreases probability of an adversary detecting a communication link and intercepting the signal. When using an embodiment of the invention, the party sending information does not generate the communication signal, decreasing the sender's operational power. An embodiment of the invention does not require the use of a retrodirectional or retroreflective optical element. The encoding device of the embodiment of the invention is, for example, constructed with standard optical windows, or even various types of glass, making the components interchangeable for different operational requirements.

DETAILED DESCRIPTION OF THE INVENTION

An embodiment of the invention includes a communications apparatus 10. As shown by way of illustration in FIG. 1, the communications apparatus 10 includes a standard entangled-photon generator 20 configured to generate a plurality of entangled pairs of photons. The plurality of entangled pairs of photons includes a plurality of idler photons 30 and a corresponding plurality of signal photons. The communications apparatus 10 includes a standard quantum memory 40 configured to store the plurality of idler photons. The communications apparatus 10 includes a standard transmitter 50 configured to transmit the plurality of signal photons. The communications apparatus 10 includes a standard optical element 60 configured to selectively reflect the plurality of signal photons so as to encode a reflected signal. The communications apparatus 10 includes a standard receiver 70 configured to detect a plurality of incoming photons. For example, the receiver 70 includes a standard single photon detector or receiver. The communications apparatus 10 includes a standard correlator 80 configured to determine the reflected signal from the plurality of incoming photons. Examples of the correlator 80 are discussed in S. TAN, ET. AL., Quantum Illumination with Gaussian States, Physical Review Letters, 2008, p. 253601, Vol. 101, American Physical Society, College Park, Md., USA; S. BARZANJEH, ET. AL., "Microwave Quantum Illumination", Physical Review Letters, 2015, pp. 080503, Vol. 114, American Physical Society, College Park, Md., USA; E. D. LOPAEVA, ET. AL., "Experimental Realization of Quantum Illumination", Physical Review Letters, 2013, pp. 153603, Vol. 110, American Physical Society, College Park, Md., USA, all of which are incorporated herein by reference. The correlator 80 determines an entanglement correlation between the plurality of incoming photons and the plurality of idler photons. A presence of entanglement correlation indicates that a detected incoming photon of the plurality of incoming photons is a reflected signal photon of the plurality of signal photons.

Figure 2:
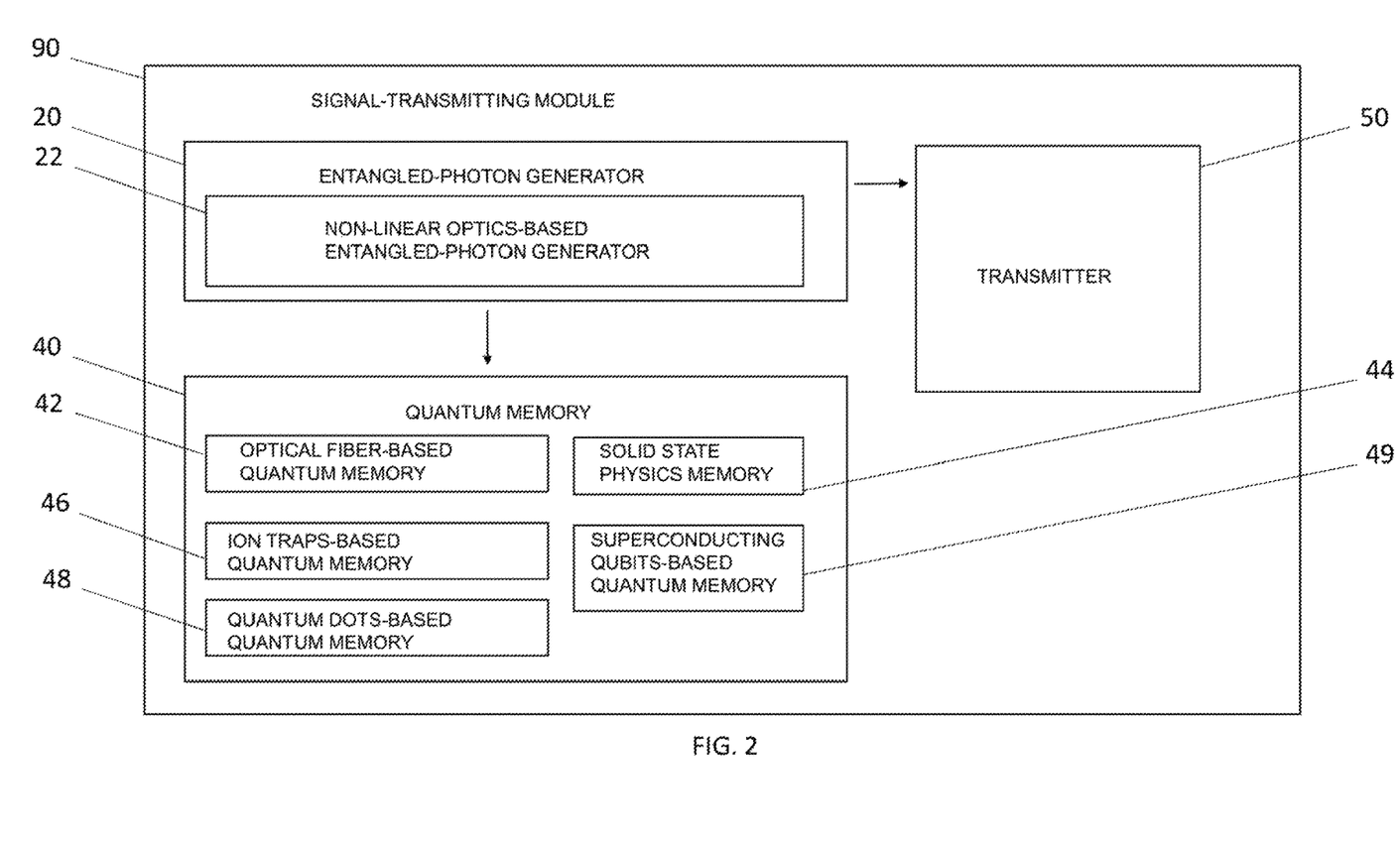
FIG. 2 is a block diagram of a signal-transmitting module according to an embodiment of the instant invention.
Figure 3:
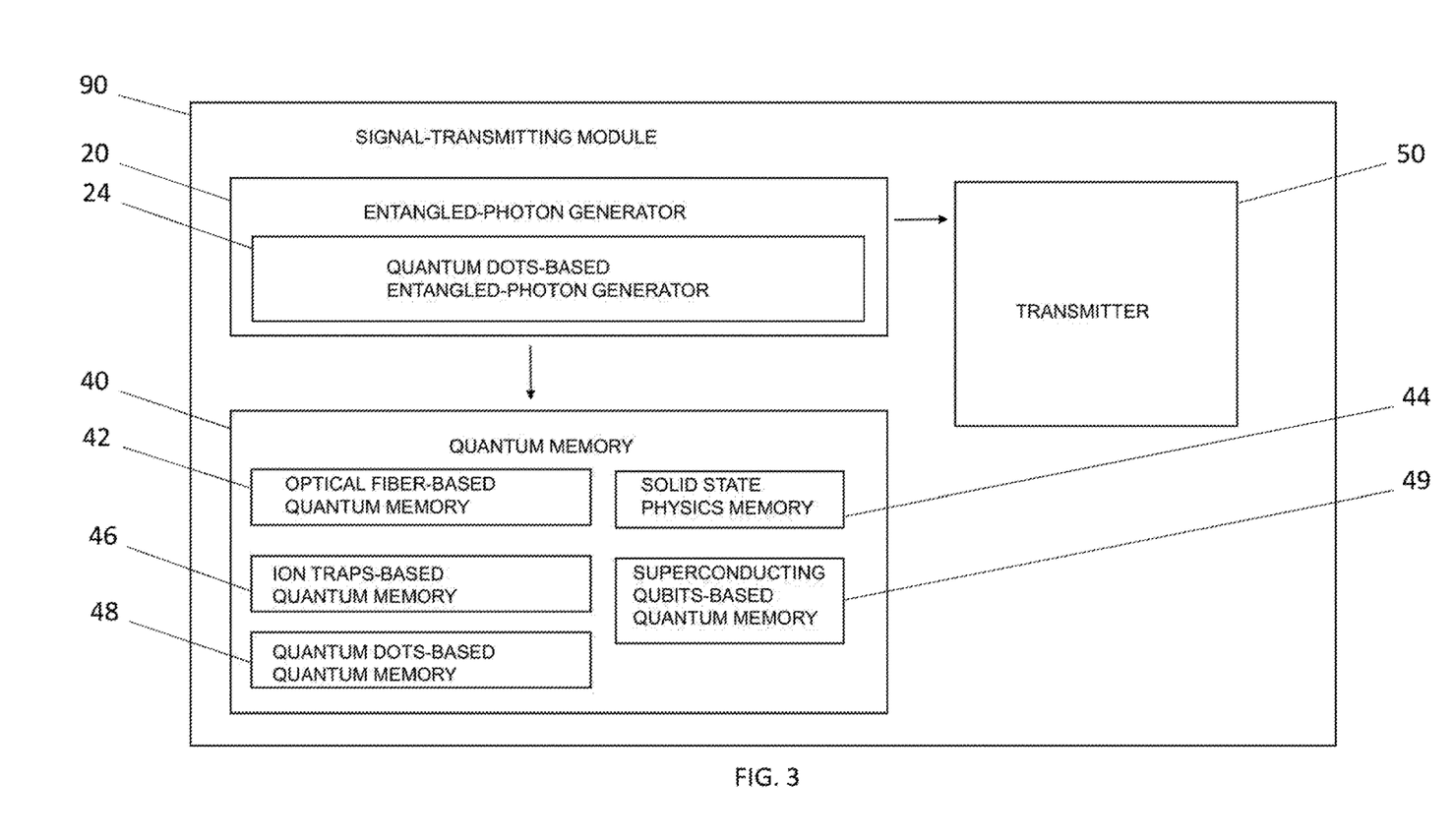
FIG. 3 is a block diagram of another signal-transmitting module according to an embodiment of the instant invention.
Figure 4:
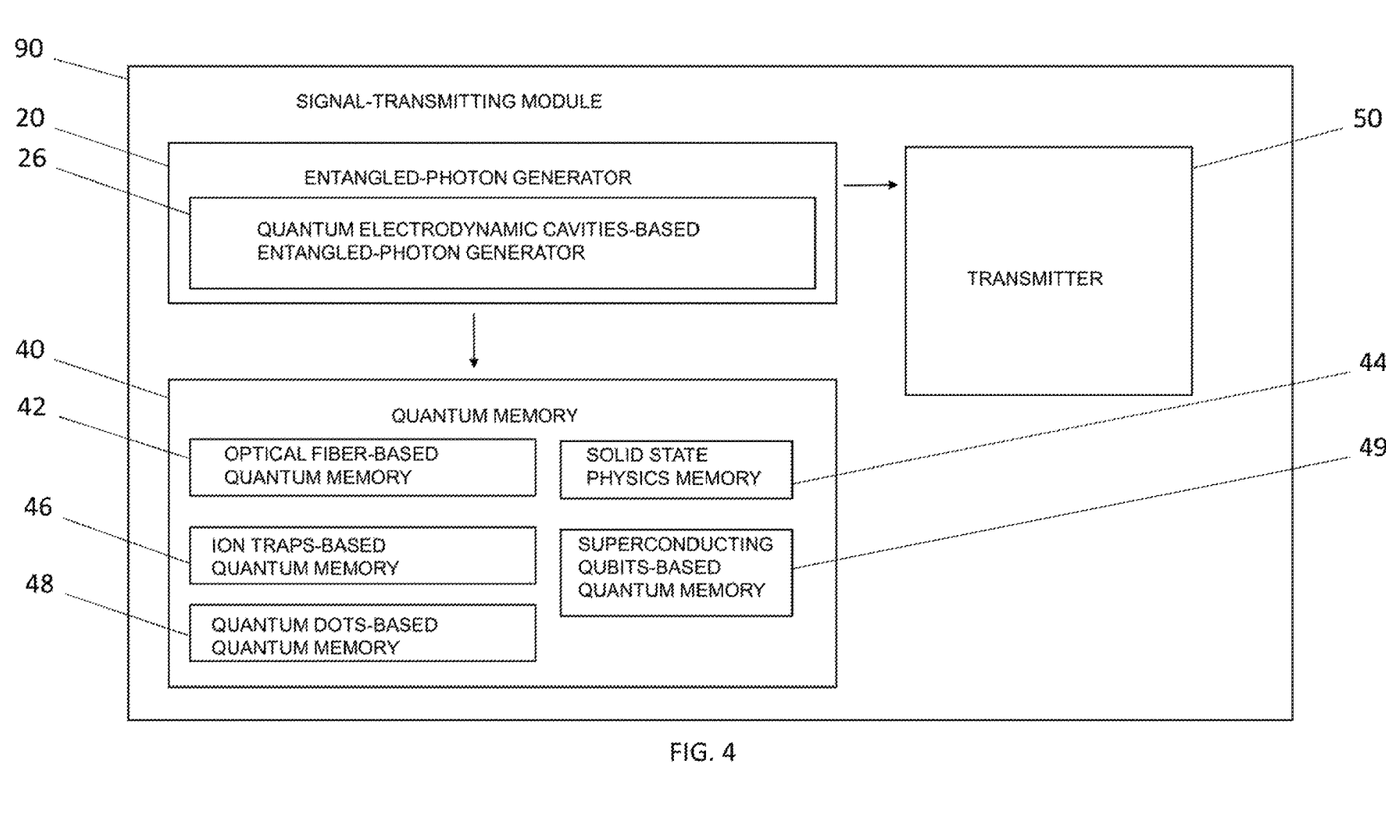
FIG. 4 is a block diagram of another signal-transmitting module according to an embodiment of the instant invention.

Optionally, the entangled-photon generator 20 includes standard non-linear optics such as in a standard non-linear optics-based entangled-photon generator 22 as shown by way of illustration in FIG. 2, standard quantum dots such as in a standard quantum dots-based entangled-photon generator 24 as shown by way of illustration in FIG. 3, and standard quantum electrodynamic cavities such as in a standard quantum electrodynamic cavities-based entangled-photon generator 26 as shown by way of illustration in FIG. 4.

Optionally, each entangled photon pair of the plurality of entangled photon pairs is entangled in polarization, entangled in quadrature, entangled in phase, entangled in photon momentum, entangled in photon number states, entangled in optical modes, or entangled in photon angular momentum.

Optionally, as shown by way of illustration in FIGS. 2-4, the quantum memory 40 includes a standard optical fiber 42, a standard solid state physics memory 44, a standard plurality of ion traps 46, a standard plurality of quantum dots 48, and/or standard superconducting qubits 49.

Figure 1:
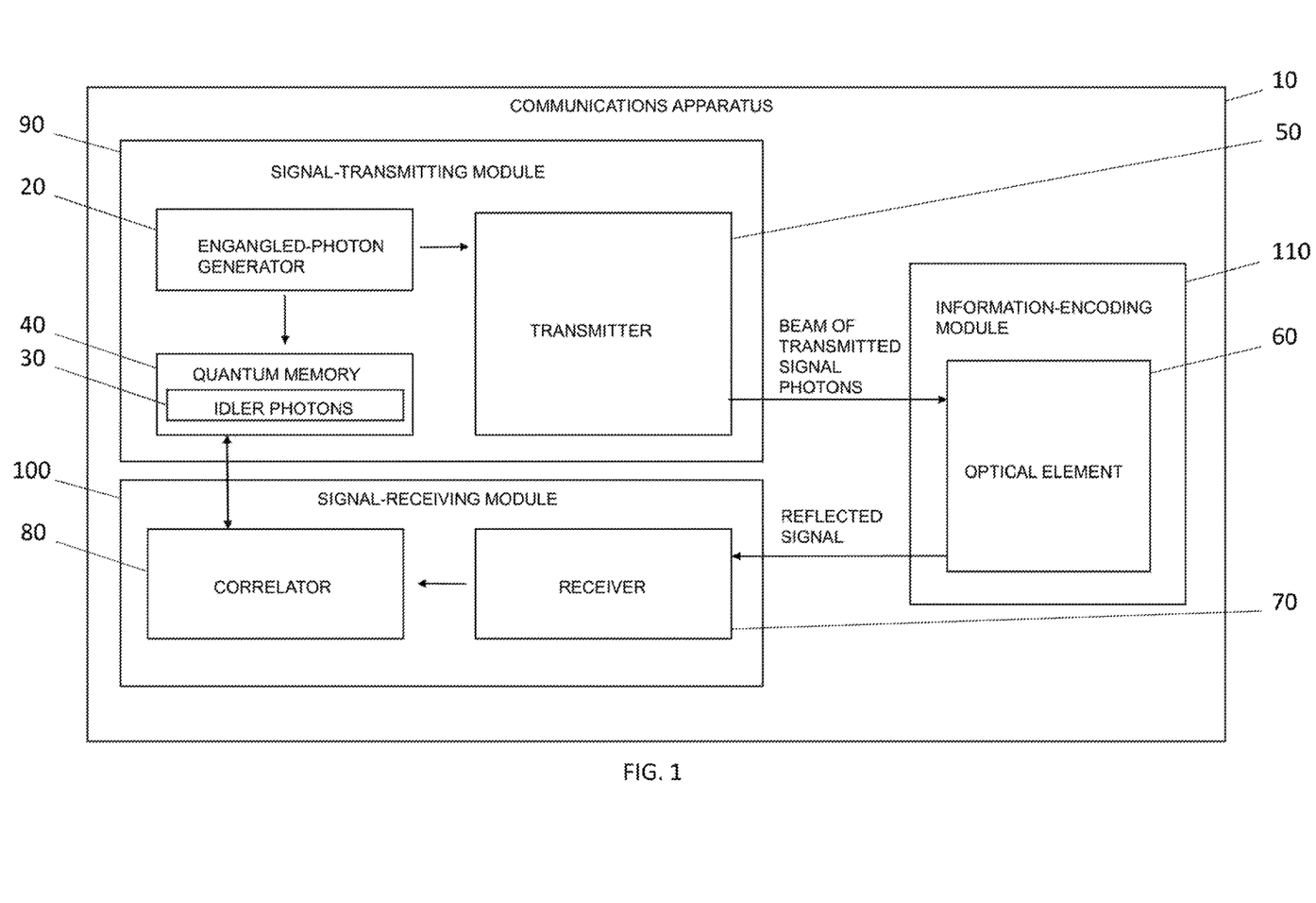
FIG. 1 is a block diagram of an embodiment of the instant invention.

Optionally, as shown by way of illustration in FIG. 1, the transmitter 50 is configured to transmit a beam. The beam includes the plurality of signal photons.

Figure 5:
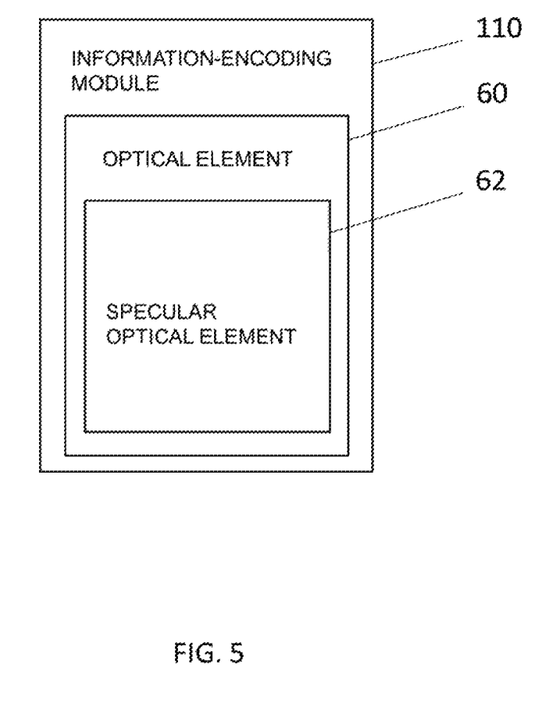
FIG. 5 is a block diagram of an information-encoding module including a specular optical element according to an embodiment of the instant invention.
Figure 6:
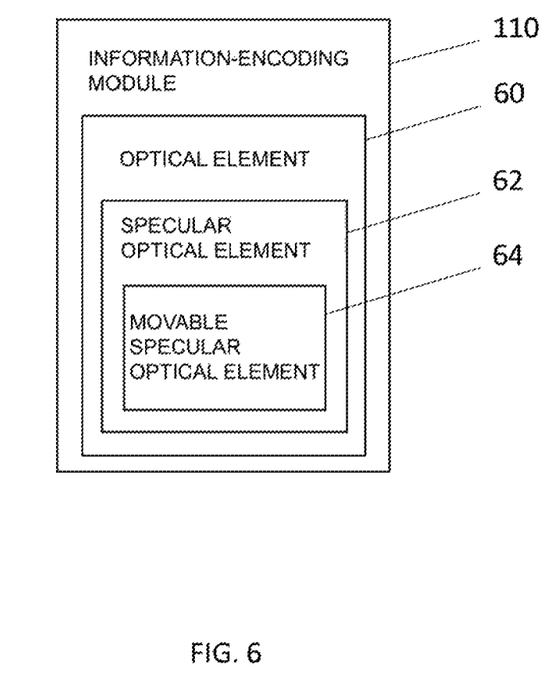
FIG. 6 is a block diagram of another information-encoding module including a movable specular optical element according to an embodiment of the instant invention.

Optionally, as shown by way of illustration in FIG. 5, the optical element 60 includes a standard specular optical element 62. Optionally, as shown by way of illustration in FIG. 6, the specular optical element includes a standard movable specular optical element 64.

Figure 7:
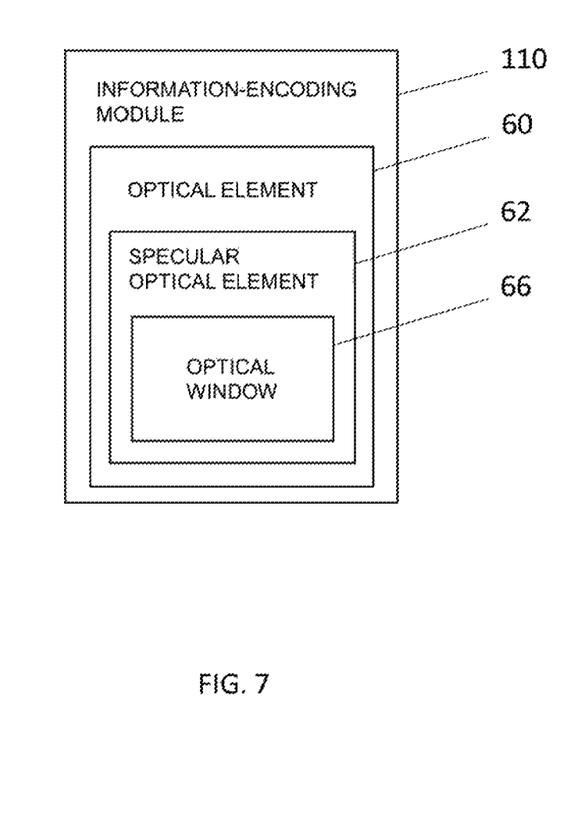
FIG. 7 is a block diagram of specular optical element including an optical window according to an embodiment of the instant invention.
Figure 8:
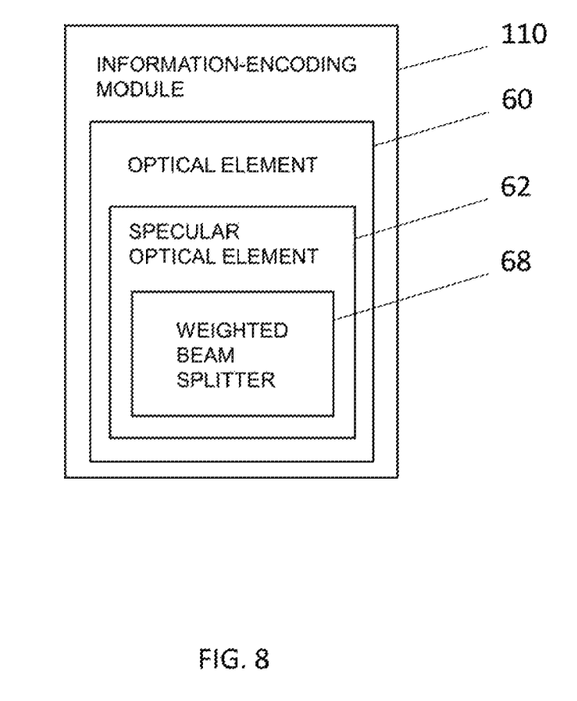
FIG. 8 is a block diagram of specular optical element including a weighted beam splitter according to an embodiment of the instant invention.
Figure 9:
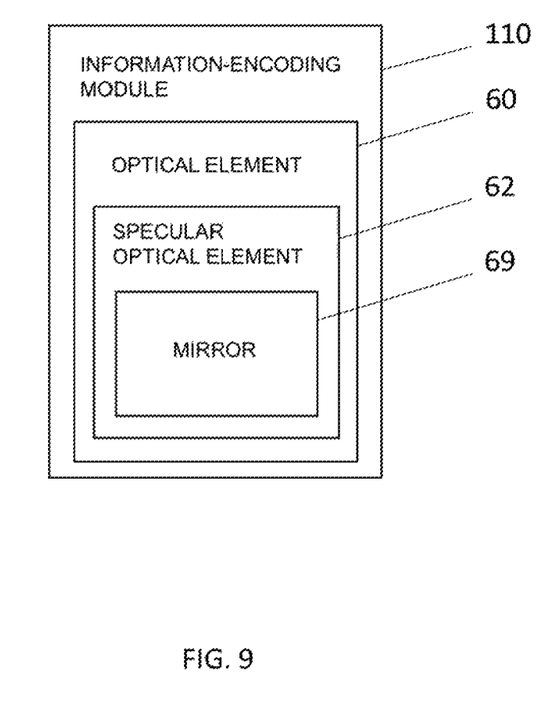
FIG. 9 is a block diagram of specular optical element including a mirror according to an embodiment of the instant invention.

Optionally, the specular optical element includes a standard optical window 66 as shown by way of illustration in FIG. 7, a standard weighted beam splitter 68 as shown by way of illustration in FIG. 8, or a standard mirror 69 as shown by way of illustration in FIG. 9.

Optionally, as shown by way of illustration in FIG. 1, the communications apparatus 10 further includes a signal-transmitting module 90. The signal-transmitting module 90 including the entangled-photon generator 20, the quantum memory 40, and the transmitter 50. Additionally, as shown by way of illustration in FIG. 1, the communications apparatus 10 optionally includes a signal-receiving module 100. The signal-receiving module 100 includes the receiver 70 and the correlator 80. Additionally, as shown by way of illustration in FIG. 1, the communications apparatus 10 optionally includes an information-encoding module 110. The information-encoding module 110 includes the optical element 60.

Another embodiment of the invention includes a method of entangled-photon-based communication. A plurality of entangled pairs of photons is generated using a standard entangled-photon generator 20. The plurality of entangled pairs of photons includes a plurality of idler photons and a corresponding plurality of signal photons. The plurality of idler photons is stored using a standard quantum memory 40. The plurality of signal photons is transmitted using a standard transmitter 50. The plurality of signal photons is selectively reflected, so as to encode a reflected signal, using a standard optical element 60. A plurality of incoming photons is detected using a standard receiver 70. The reflected signal is discriminated from ambient photons of the plurality of incoming photons using a standard correlator 80. Discriminating the reflected signal from ambient photons of the plurality of incoming photons using a correlator includes the following. An entanglement correlation of a detected incoming photon of the plurality of incoming photons with a corresponding idler photon of the plurality of idler photons is determined. That the detected incoming photon originated as a transmitted signal photon of the plurality of signal photons is determined from a presence of the entanglement correlation. The determining an entanglement correlation of a detected incoming photon of the plurality of incoming photons with a corresponding idler photon of the plurality of idler photons and the determining from a presence of the entanglement correlation that the detected incoming photon originated as a transmitted signal photon of the plurality of signal photons, are repeated until a standard stop code is received at the receiver.

Optionally, the entangled-photon generator 20 includes standard non-linear optics, standard quantum dots, or standard quantum electrodynamic cavities.

Optionally, each entangled photon pair of the plurality of entangled photon pairs is entangled in polarization, entangled in quadrature, entangled in phase, entangled in photon momentum, entangled in photon number states, entangled in optical modes, or entangled in photon angular momentum.

Optionally, the quantum memory 40 includes a standard optical fiber, a standard solid state physics memory, a standard plurality of ion traps, a standard plurality of quantum dots, and/or standard superconducting qubits.

Optionally, transmitting the plurality of signal photons using a transmitter includes transmitting a beam. The beam includes the plurality of signal photons.

Optionally, the optical element 60 includes a standard specular optical element 62. Optionally, the specular optical element includes a movable specular optical element 64. The specular optical element includes a standard optical window 66, a standard weighted beam splitter 68, or a standard mirror 69.

Optionally, the method further includes the following. A signal-transmitting module 90 is provided. The signal-transmitting module 90 includes the entangled-photon generator 20, the quantum memory 40, and the transmitter 50. A signal-receiving module 100 is provided. The signal-receiving module 100 includes the receiver 70 and the correlator 80. An information-encoding module 110 is provided. The information-encoding module 110 includes the optical element 60.

Another embodiment of the invention includes a communications apparatus 10, which includes a signal-transmitting module 90, a signal-receiving module 100, and an information-encoding module 110. For ease of understanding, the signal-transmitting module 90 and the signal-receiving module 100 together are referred anthropomorphically as Bob, and the information-encoding module 110 is referred anthropomorphically as Alice. The communications apparatus 10 includes a standard source of entangled pairs of photons (i.e., a standard entangled-photon generator 20, wherein each such entangled pair includes a signal photon and idler photon), a standard quantum memory 40 for Bob to keep the idler photon, standard single photon detectors/receivers 70, a standard signal processing device or correlator 80 that correlates the incident photons with the idler photon, and a standard optical information-encoding device or module 110 to encode Alice's message in the signal photon from Bob. Alice's information-encoding module 110 includes, for example, a minimally reflective/highly transmissive optical element 60, which is used to encode 0's and 1's. One of ordinary skill in the art will readily appreciate that the exact transmissivity value affects the range and fidelity of the communications apparatus, and can be varied depending on the user's application. That is, one of ordinary skill in the art will readily appreciate that the exact transmissivity of the optical element depends on a user's operational requirements.

With reference to FIG. 1, a communication protocol according to this embodiment of the invention goes as follows.

First, Bob's entangled-photon generator 20 prepares an entangled pair of photons.

Second, Bob stores one half of an entangled-photon pair in the quantum memory 40, the other half of the entangled-photon pair gets sent, i.e., transmitted in a beam, in Alice's direction.

Third, Alice transmits information to Bob's signal-receiving module 100 by selectively obstructing the photon Bob sends with her highly transmissive optical element 60. The presence of the optical element 60 relays one classical bit, and the absence thereof relays the opposite classical bit.

Fourth, Bob's signal-receiving module 100 correlates the photons received from Alice's direction to the ones he stores in the quantum memory 40. Bob's signal-receiving module 100 includes a standard correlator 80 for detecting the presence of an entanglement correlation in the photons received from Alice's direction to the ones he stores in memory.

In this protocol, Bob continually probes the environment for photons coming from Alice's direction to correlate with the photons he has in his quantum memory 40. The initial entanglement aides Bob in discriminating between noise photons and the photons that are reflected by Alice's optical element 60. Additionally, although Alice is sending information to Bob, the information transfer is almost completely powered by the signal generated from Bob; the only energy Alice expends is that of moving her optical element 60. Such a protocol greatly reduces Alice's power requirements because she is not generating the low brightness source. In addition, the brightness of Bob's photon-entanglement generator 20 can be made so weak (discussed after Eqn. (3) below), that the contributions from both the transmitted and reflected signals are indistinguishable from environmental noise. Combining that with the fact that Alice's object can be made small and highly transmissive, and therefore nearly optically clear, this protocol not only has a low probability of adversarial interception, but also it can be executed covertly.

The following equations describe Bob's probability of detecting the presence of Alice's optical element 60 (e.g., a standard optical window 66). An assumption of these equations is that the transmitter 50 is a highly collimated beam with a divergence angle θ and that a target has cross section σ. Given this assumption, the beam divergence is small, and the illuminated area is approximated as $$A_i \approx \pi\left(\frac{w + R\theta}{2}\right)^2$$

where R is the range and w is the beam waist. As long as the illuminated area is smaller than the cross section of an object ($A_i < \sigma$), the reflected energy from the object is rewritten as $$P_r = P_t \times e^{-2\chi R} \times \mathcal{R} \times \frac{A_r}{4\pi R^2} \quad (1)$$

where $P_t$ is the emitted power, the second term is the atmospheric attenuation to and from the object at a range R, the third term is the isotropic radiation scattered by a target of reflectivity $\mathcal{R}$ and finally, the fourth term is the portion of the isotropic power received by an optical element of area $A_r$. Eqn. (1) is valid as long as $$R < \frac{2\sqrt{\sigma/\pi} - w}{\theta}$$

A surface is considered rough/diffuse if the size of the surface irregularities are comparable, or greater, than the wavelength of the illuminating signal. If the object is diffuse, the radiation diffused on the half plane towards the detector is considered to be $$P_{rd} = P_t \times \mathcal{R} \times e^{-2\chi R} \times \frac{A_r}{4\pi R^2} \times 2\pi = \frac{P_t A_r e^{-2\chi R}}{2R^2}$$

However, if the object is a smooth surface, and the scattering is mostly in the specular direction, then this can be written $$P_{rs} = P_t \times \mathcal{R} \times e^{-2\chi R}$$

as long as the area of the receiver/detector $A_r$ is larger than the illuminated area at a distance 2R:

$$A_r > \pi\left(\frac{w + 2R\theta}{2}\right)^2 \Rightarrow R < \frac{2\sqrt{A_r/\pi} + w}{2\theta}$$

In the above expressions, the cross sections for diffuse (d) and smooth (s) flat targets of area A are given by $$\sigma_d = 4A \text{ and } \sigma_s = \frac{4\pi A^2}{\lambda^2}$$

The total power transmitted by Bob is $$P_t = Nh\nu$$

where N is the number of photons transmitted per unit time, h is Planck's constant, and ν the frequency.

The principal sources of noise are the shot noise $N_{sn}$, the solar background radiation $N_{br}$, and the dark counts $N_{dc}$. So, the total number of noise photons $N_t$ is written as $$N_t = N_{sn} + N_{br} + N_{dc}$$

Then, the total power due to noise is given by $P_N = h\nu N_t$. These expressions are approximated as $$N_{sn} \approx 1$$

$$N_{br} \approx \eta N_b$$

$$N_{dc} \approx \frac{\sqrt{2R_{dc}}}{\eta}$$

where $\eta$ is the quantum efficiency of the detector, and $R_{dc}$ is the dark count rate of the detector. The number of noise ("thermal") photons due to the solar background radiation is given by Planck's formula $$N_b = \frac{1}{e^{h\nu/kT} - 1}$$

where k is Boltzmann's constant and T is the sun's temperature (T≈6000° K). Bringing all the equations together, the signal-to-noise ratio is written as $$S = \frac{\eta P_r}{P_N}$$

and there are two cases to consider.

In the first case, if the object is diffuse and $$R^2 < \frac{4\sigma_d}{\pi\theta^2} = \frac{16A}{\pi\theta^2},$$

then $$S_d = \frac{N\eta Re^{-2\chi R} A_r}{2R^2\left(1 + \eta N_b + \frac{\sqrt{2R_{dc}}}{\eta}\right)} \quad (2)$$

In the second case, if the object is smooth and $$R < \left\{ \frac{2\sqrt{\frac{\sigma}{\pi}} - w}{\theta}, \frac{2\sqrt{\frac{A_r}{\pi}} - w}{2\theta} \right\},$$

then $$S_s = \frac{N\eta Re^{-2\chi R}}{1 + \eta N_b + \frac{\sqrt{2R_{dc}}}{\eta}}. \quad (3)$$

Using the standard quantum estimation and detection techniques, the detection probability equations in terms of the signal-to-noise ratio S are obtained:

$$P_q = 1 - e^{-S} \text{ and } P_c = 1 - e^{-S/4} \quad (4)$$

for entangled (q) and non-entangled (c) signals.

Because an embodiment of the invention is reliant on Bob's ability to detect the presence of Alice's optical element 60, the probability of detecting objects of various reflectivity/transmissivity is calculated using Eqn. (4). The capability of producing 10 MHz of entangled pairs at 800 nm, that Bob's receiver/detector 70 has a dark count of 1 Hz, and that the detectors have a quantum efficiency of 80% are all assumed. The diameter of the beam is ¼ m, the divergence angle is 40 μRad, the diameter of the receiver is 2 m, and that the sampling rate is 1 ms are also assumed. Alice's optical element 60 is smooth with a diameter of 1 mm is assumed. Note that these exact specifications are not critical to the operation of the invention and are only used to model the expected probability of detecting Alice's optical element 60 in this specific case. Rather, these specifications are given as being illustrative and instructive to one of ordinary skill in the art in the construction of an embodiment of the invention.

By way of example, for an embodiment of the invention including the above-mentioned specifications, the expected probability of detection can be calculated, when the reflectivity of the test object is 0.5. From such a calculation, the probability of detection at 8.2 km is estimated to be approximately 80%. If the test object's reflectivity is much lower—since the scattering is specular—the test object's presence can still be detected with relativity high certainty at a range of kilometers. As another example, the probability of detection for a specular object with a reflectivity of 0.1 can be calculated: here, the test object with 80% efficiency is estimated to be detected at approximately 6.2 km. From calculating both parts of Equation (4), using entangled light increases operational range significantly verses classical light. As yet another example, if Alice used an object with reflectivity ¹⁄₁₀₀, Bob could still receive her message with 80% efficiency at a range of 3.7 km. One of ordinary skill in the art will readily appreciate that the reflectivity/transmissivity of Alice's optical element can be altered to suit various operational requirements.

Equations (2) and (4) show that the range at which one can detect a diffuse object is significantly decreased from that of a smooth object. Unless made intentionally smooth, most surfaces have imperfections larger than 10 μm (the approximate wavelength of the signal) and reflect diffusely. Therefore, the objects surrounding Alice's optical element 60 are not be detectable by Bob's signal-receiving module 100, and therefore once the communication protocol commences, Bob can discriminate the presence of Alice's object from background objects with relatively high certainty.

Portions of the invention operate in a standard computing operating environment, for example, a desktop computer, a laptop computer, a mobile computer, a server computer, and the like, in which embodiments of the invention may be practiced. While the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention is described as follows. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
    an entangled-photon generator configured to generate a plurality of entangled pairs of photons, the plurality of entangled pairs of photons comprising a plurality of idler photons and a corresponding plurality of signal photons;

a quantum memory configured to store the plurality of idler photons;

a transmitter configured to transmit the plurality of signal photons;

an optical element configured to selectively reflect the plurality of signal photons so as to encode a reflected signal;

a receiver configured to detect a plurality of incoming photons;

a correlator configured to determine the reflected signal from the plurality of incoming photons, said correlator determining an entanglement correlation between the plurality of incoming photons with the plurality of idler photons, a presence of entanglement correlation indicating that a detected incoming photon of the plurality of incoming photons is a reflected signal photon of the plurality of signal photons.

2. The apparatus according to claim 1, wherein said entangled-photon generator comprises one of non-linear optics, quantum dots, and quantum electrodynamic cavities.

3. The apparatus according to claim 1, wherein each entangled photon pair of the plurality of entangled photon pairs is one of entangled in polarization, entangled in quadrature, entangled in phase, entangled in photon momentum, entangled in photon number states, entangled in optical modes, and entangled in photon angular momentum.

4. The apparatus according to claim 1, wherein said quantum memory comprises at least one of an optical fiber, a solid state physics memory, a plurality of ion traps, a plurality of quantum dots, and superconducting qubits.

5. The apparatus according to claim 1, wherein said transmitter is configured to transmit a beam, the beam comprising the plurality of signal photons.

6. The apparatus according to claim 1, wherein said optical element comprises a specular optical element.

7. The apparatus according to claim 6, wherein said specular optical element comprises a movable secular optical element.

8. The apparatus according to claim 7, wherein said specular optical element comprises one of an optical window, a weighted beam splitter, and a mirror.

9. The apparatus according to claim 1, further comprising:
a signal-transmitting module comprising said entangled-photon generator, said quantum memory, and said transmitter;
a signal-receiving module comprising said receiver and said correlator; and
an information-encoding module comprising said optical element.

10. A method of communication comprising:
generating a plurality of entangled pairs of photons using an entangled-photon generator, the plurality of entangled pairs of photons comprising a plurality of idler photons and a corresponding plurality of signal photons;
storing the plurality of idler photons using a quantum memory;
transmitting the plurality of signal photons using a transmitter;
selectively reflecting the plurality of signal photons so as to encode a reflected signal using an optical element;
detecting a plurality of incoming photons using a receiver;
discriminating the reflected signal from ambient photons of the plurality of incoming photons using a correlator, said discriminating the reflected signal from ambient photons of the plurality of incoming photons using a correlator comprising:
determining an entanglement correlation of a detected incoming photon of the plurality of incoming photons with a corresponding idler photon of the plurality of idler photons;
determining from a presence of the entanglement correlation that the detected incoming photon originated as a transmitted signal photon of the plurality of signal photons; and
repeating said determining an entanglement correlation of a detected incoming photon of the plurality of incoming photons with a corresponding idler photon of the plurality of idler photons and said determining from a presence of the entanglement correlation that the detected incoming photon originated as a transmitted signal photon of the plurality of signal photons, until a stop code is received at the receiver.

11. The method according to claim 10, wherein the entangled-photon generator comprises one of non-linear optics, quantum dots, and quantum electrodynamic cavities.

12. The method according to claim 10, wherein each entangled photon pair of the plurality of entangled photon pairs is one of entangled in polarization, entangled in quadrature, entangled in phase, entangled in photon momentum, entangled in photon number states, entangled in optical modes, and entangled in photon angular momentum.

13. The method according to claim 10, wherein the quantum memory comprises at least one of an optical fiber, a solid state physics memory, a plurality of ion traps, a plurality of quantum dots, and superconducting qubits.

14. The method according to claim 10, wherein said transmitting the plurality of signal photons using a transmitter comprises:
transmitting a beam, the beam comprising the plurality of signal photons.

15. The method according to claim 10, wherein said optical element comprises a specular optical element.

16. The method according to claim 15, wherein said specular optical element comprises a movable specular optical element.

17. The method according to claim 16, wherein said specular optical element comprises one of an optical window, a weighted beam splitter, and a mirror.

18. The method according to claim 10, further comprising:
providing a signal-transmitting module comprising the entangled-photon generator, the quantum memory, and the transmitter;
providing a signal-receiving module comprising the receiver and the correlator; and
providing an information-encoding module comprising the optical element.

* * * * *